United States Patent [19]

Hahn

[11] Patent Number: 4,692,755
[45] Date of Patent: Sep. 8, 1987

[54] LOADING DOCK SIGNAL AND CONTROL SYSTEM

[75] Inventor: Norbert Hahn, South Milwaukee, Wis.

[73] Assignee: Rite-Hite Corporation, Milwaukee, Wis.

[21] Appl. No.: 704,430

[22] Filed: Feb. 22, 1985

[51] Int. Cl.$^4$ .............................................. G08B 21/00
[52] U.S. Cl. ................................... 340/687; 340/686; 414/401
[58] Field of Search ...................... 414/401, 396, 584; 340/686, 687, 525; 410/7, 18

[56] References Cited

U.S. PATENT DOCUMENTS

| | | | |
|---|---|---|---|
| 3,537,094 | 1/1966 | Hawkins et al. | 340/691 X |
| 3,671,955 | 6/1972 | Malekzadeh | 340/85 |
| 4,191,503 | 3/1980 | Neff et al. | 340/687 |
| 4,205,300 | 5/1980 | Ho et al. | 340/65 |
| 4,264,259 | 4/1981 | Hipp | 414/401 |
| 4,271,401 | 6/1981 | Meo | 340/687 |
| 4,282,621 | 8/1981 | Anthony et al. | 14/71.1 |
| 4,373,847 | 2/1983 | Hipp et al. | 414/401 |
| 4,443,150 | 4/1984 | Hahn et al. | 414/401 |
| 4,488,325 | 12/1984 | Bennett et al. | 414/401 X |

OTHER PUBLICATIONS

Kelley, "Truck Stop" Automatic Trailer Restraining Device, ©1982.
Dok-Lok by Rite Hite, 10/80.

*Primary Examiner*—Glen R. Swann, III
*Assistant Examiner*—Jeffery A. Hofsass
*Attorney, Agent, or Firm*—Neuman, Williams, Anderson & Olson

[57] ABSTRACT

A signal and control system is provided in which signal lights are provided on the inside and outside of a dock facility to give dock personnel and truck drivers clearly visible indications of when it is safe or unsafe to load or unload a truck or to park to remove a truck, dependent upon the condition of switches on the inside which are accessible to dock personnel and to the condition of a locking device on the outside which is engageable with the safety bar of a truck. A slip clutch and a position sensor cooperate to control and avoid adverse effects of slippage in the locking device, a horn is energized to provide a loud audible warning of dangerous conditions, a key pad is used to enter a security code and other features are provided for increased safety and reliability.

8 Claims, 6 Drawing Figures

LOADING DOCK SIGNAL AND CONTROL SYSTEM

This invention relates to a loading dock signal and control system and more particularly to a system which is readily operable and which provides signals in a manner such as to prevent improper and unsafe operation. The system is easily installed, highly reliable and is economically manufacturable.

BACKGROUND OF THE INVENTION

Devices have heretofore been provided for securely retaining parked vehicles at a loading dock for the purpose of preventing movement of the vehicle during loading and unloading thereof by dock personnel.

An advantageous releasable locking device for this purpose is disclosed in the Hipp U.S. Pat. No. 4,264,259, issued Apr. 28, 1981. The device of the Hipp patent includes a locking member in the form of a hook which is pivotally supported to be movable from a lower unlocked position to an upper locked position in which it is lockingly engageable with a safety bar of a parked vehicle to hold the parked vehicle against the dock.

As indicated in the Hipp patent, suitable switches may be provided for signalling the condition of the locking device and timers and pushbutton controls may be provided for activating an electrical motor of the device for a time interval of only a short duration, for example, one second, to move the locking member from an inoperative mode to an operative mode, or vice versa. In the practical implementation of use of devices such as shown in the Hipp patent, certain problems may occur especially with regard to safety, more particularly in that the vehicle operators and dock personnel are sometimes not given adequate warning in the event of certain possible malfunctions of the device.

SUMMARY OF THE INVENTION

This invention was evolved with the general object of providing a system having maximum safeguards with respect to insuring safety of operating personnel and preventing damage to equipment.

A further object of the invention is to provide a system which is readily and economically manufacturable and which can be easily installed, while being highly reliable in operation.

An important aspect of the invention is in the discovery and recognition of problems which might possibly occur in the operation of a loading dock facility which includes a releasable locking device.

One problem is in insuring that both the operators of vehicles desiring to park a vehicle and the operating personnel charged with loading and unloading a parked vehicle are provided with adequate warning as to the existence of unsafe conditions as well as signals to indicate that it is safe to park or remove a vehicle or to load and unload a parked vehicle.

In a system constructed in accordance with the invention, signal lights are provided, preferably including red and green strobe lamps on the outside of a loading dock and also red and green lights on the inside of the loading dock, with such lights being operated by control circuitry to indicate both when it is safe and unsafe to park or remove a vehicle and when it is safe and unsafe to unload a parked vehicle, with manually operable switches being provided for operation by the dock personnel to operate a locking device.

Important features of the invention relate to the provision of a slippage control feature. It has been discovered that it can sometimes happen that the hook member of a locking device, after being moved to a locked position, may become lowered to a lower unlock position due, for example, to vibrations which may be produced during loading and/or unloading of a vehicle. It has also been discovered that such slipping may occur due to the fact that the locking device desirably includes a drive arrangement with a slip clutch between a drive motor and the hook member, with the drive motor being energized for a time interval sufficient to insure movement of the locking member to either a locked position or an unlocked position. When, for example, the hook member reaches a position in firm locking engagement with the safety bar of a vehicle, the clutch may slip, and the exact positioning of the safety bar in relation to the locking device is not as critical as it would otherwise be if the distance of movement of the locking member were fixed.

The slippage control feature relates to the sensing of downward slipping movement of a locking member to an intermediate position, below the locked position, and to the automatic responsive operation of actuating means to move the member back toward the locked condition. With this feature, there is assurance that the locked condition will be maintained, if possible, and at the same time, the locking device may include a slip clutch having the aforementioned advantages.

In accordance with a specific feature, the slip-page control operation is repeated after a certain time delay following an operation in which it is unsuccessful. In addition, when repeated operations within a certain point set allowable time interval fail to return the lock member to its locked position, an alarm signal is developed for the purpose of indicating to vehicle operators and dock personnel that an unsafe condition exists.

Another malfunction that may possibly occur is that the hook member may not engage the safety bar of a vehicle and may continue its movement to a position well beyond the locked position. The system is operative to detect this malfunction and to provide warnings to the operating personnel.

In accordance with the specific feature, an audible signal device, preferably a loud horn, is activated in response to a malfunction such as the positioning of the locking member below a locked position. In addition, both the red strobe lamps on the outside and red lamps on the inside may be energized.

Another feature relates to means for turning off the horn while continuing to signal a malfunction condition. For example, the red and green lights on the inside may be flashed alternately while energizing the outside red light.

A further feature relates to the provision of a key pad for entry of a horn silence code which is stored internally in the circuitry of the system, so that only authorized personnel with knowledge of the code may disable the horn or other audible signal device.

Additional features relate to a construction such that a membrane switch panel may be used to the provision of means for interfaces to leveler limit switches and auxiliary pushbuttons, to the provision of overcurrent protection, and to the provision of means for indicating failure of strobe lamps.

These and other objects, features and advantages will become more fully apparent from the following detailed description taken in conjunction with the accompanying drawings.

DESCRIPTION OF A PREFERRED EMBODIMENT

Figure 1:
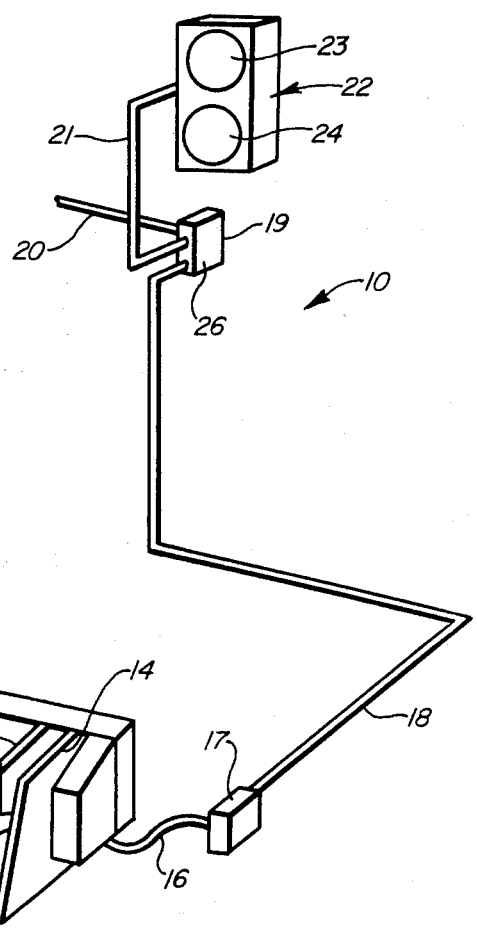
FIG. 1 is a perspective view showing the components of a loading dock protective system constructed in accordance with the invention.

Reference numeral 10 generally designates a loading dock protective system constructed in accordance with the principles of the invention. The system 10 includes a locking device 11 which is securely mounted on a loading dock and which may, for example, be constructed in the manner as disclosed in the Hipp U.S. Pat. No. 4,264,259, the disclosure of which is incorporated by reference.

Device 11 includes a locking member 12 in the form of a hook which is pivotally supported for movement from a lower unlocked position to an upper locked position in which it is lockingly engageable with a safety bar at the rear of a vehicle to be loaded or unloaded. In FIG. 1, locking member 12 is shown in a raised position, approaching a locked position for engagement with a vehicle safety bar which is not shown but which may be positioned on a pair of plate members 13 and 14 when a vehicle is backed up against the dock. Locking member 12 is operated by an electrically actuatable unit which may include an electric motor and which is coupled through conductors of a cable 16 to an electrical box 17. Additional conductors of the cable 16 connect to switches which are operated by a cam on a support shaft for the locking member for signalling the angular position of the locking member 12.

The motor and switch conductors are connected through conductors in a suitable conduit 18 to a control box 19 located on the inside of the loading dock facility. Circuitry within the box 19 is connected through conductors in a conduit 20 to an electrical power source and through conductors in a conduit 21 to a strobe lamp box 22 on the outside of the loading dock facility. Strobe lamp 22 includes upper and lower strobe lamp units 23 and 24, respectively, operable to project red and green lights.

Figure 2:
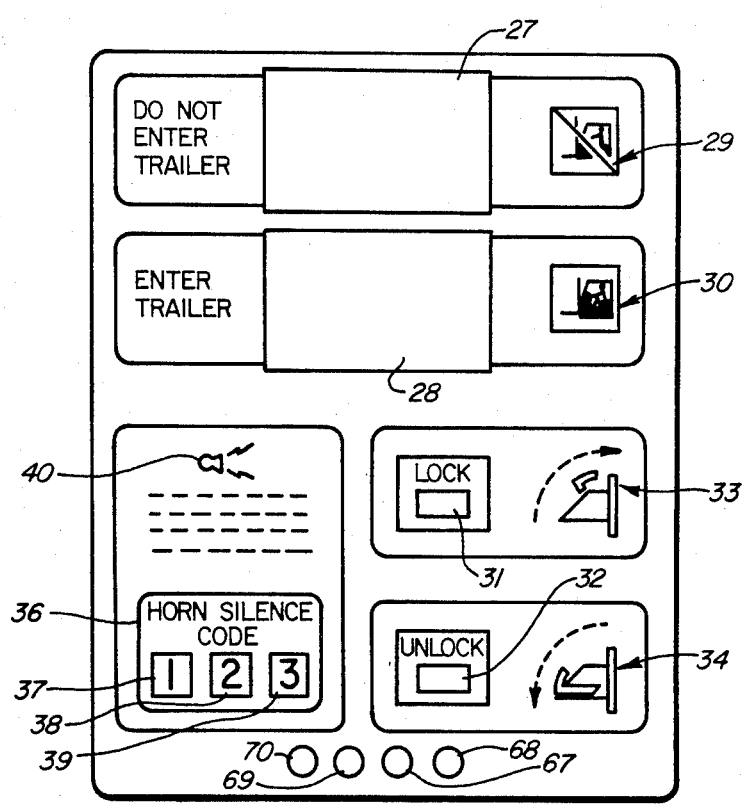
FIG. 2 shows a control panel of the system.

FIG. 2 illustrates the layout of a control panel 26 of the control box 19. It includes red and green light units 27 and 28, with indicia to the left of unit 27 "DO NOT ENTER TRAILER" and with indicia to the left of unit 28 "ENTER TRAILER".

Illustrations 29 and 30 are provided to the right of the green light units 27 and 28. Illustration 30 shows a lift truck in a square or a box margin, to show that it is safe to operate a lift truck for loading or unloading of a parked vehicle. Illustration 29 is similar to illustration 30 but includes a diagonal line through the lift truck illustration, to show that it is unsafe to operate a lift truck. Control panel 26 also includes switch actuators 31 and 32, respectively, labelled "LOCK", and "UNLOCK" and illustrations 33 and 34 are provided adjacent thereto to illustrate that upon operation of the actuator 31, the hook will be moved upwardly and that upon operation of the actuator 32, the hook will be moved downwardly.

In addition, the control panel 26 includes a key pad 36 having the label "HORN SILENCE CODE" and containing three switch actuators 37, 38 and 39, respectively, labelled "ONE", "TWO" and "THREE". Above the key pad 36, there is an illustration 40 of a horn, with underlined instructions which may read as follows:

IF HORN SOUNDS OR RED LIGHT IS ON,
DOK-LOK IS NOT PROPERLY ENGAGED.
.CHECK OPERATION OF DOK-LOK
.TRAILER MAY NOT BE AGAINST DOCK
.ICC BAR MAY NOT BE SERVICEABLE
.SECURE TRAILER BY OTHER MEANS

Figure 3:
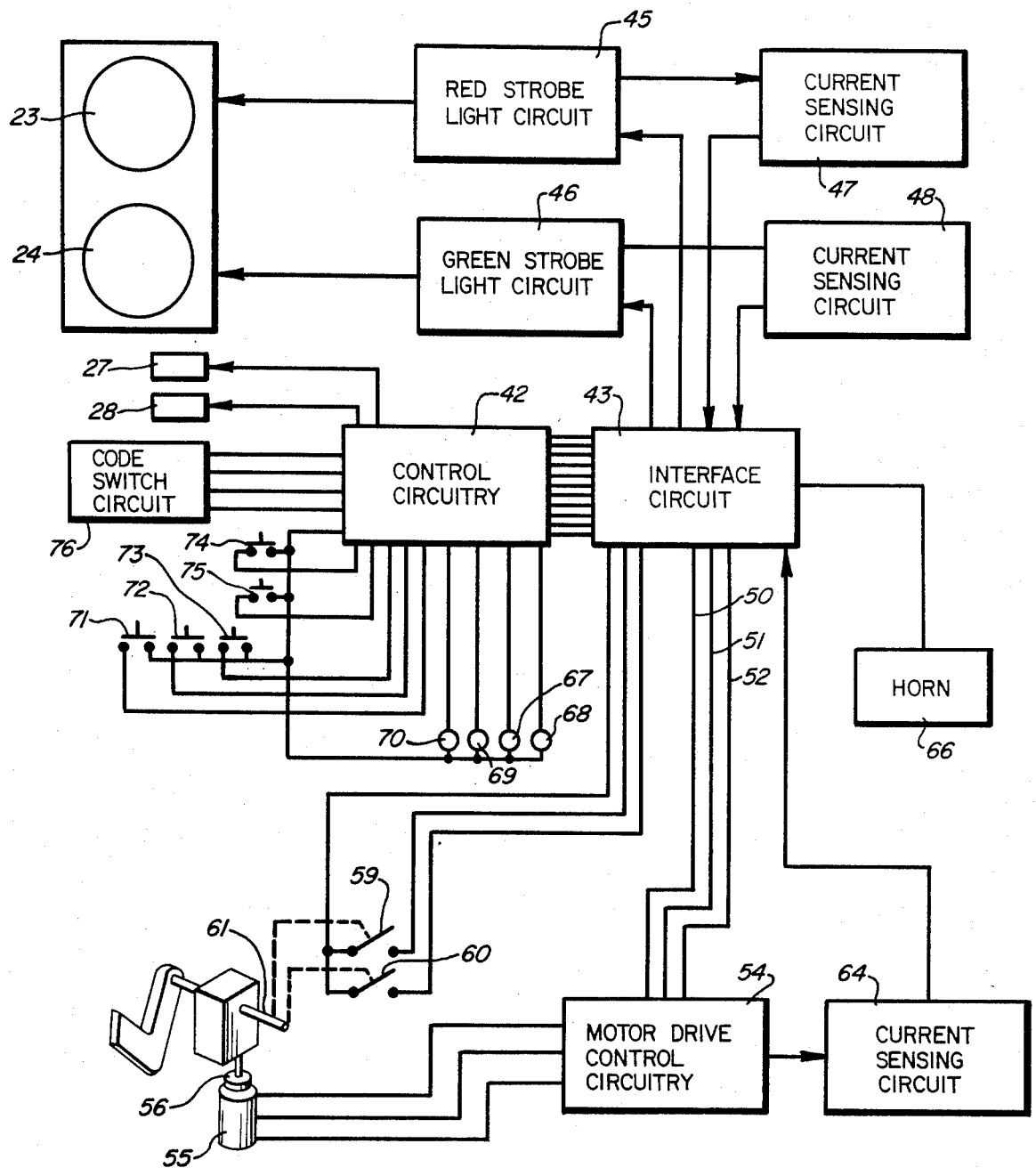
FIG. 3 is a schematic diagram showing electrical circuitry of the system and the connection thereof to components of the system.

FIG. 3 is a schematic diagram of the electrical circuitry which includes control circuitry 42 connected to switches and lights of the control box 19 and also connected through interface circuitry 43 to various components of the system. In particular, the circuitry 42 is connected through the interface circuitry 43 to a red strobe light circuit 45 and a green strobe light circuit 46, also to current sensing circuits 47 and 48 which are associated with the circuits 45 and 46 and which are arranged to develop fault signals when the strobe lamps fail to operate in response to application of an energizing signal.

In addition, the circuitry 42 is connected through the interface circuitry 43 and through conductors 50, 51 and 52 to a motor drive control circuit 54 which is connected to a drive motor 55 of the locking device 11. As diagrammatically illustrated, motor 55 operates through a slip clutch 56 to drive a reduction unit 57 and to rotate the locking member 12. As also indicated diagrammatically, switches 59 and 60 are provided which are operated in response to rotation of a support shaft 61 for the locking member 12, preferably by means of suitable cams.

By way of example, it may be assumed that the locking member 12 is down in a fully unlocked position at a zero degree angular position. The switch 59 may be operated to be opened from a minus 20 degree position to a plus 35 degree position, any position within that range being what may be described as an unlocked position. Switch 60 may be open from a plus 70 degree position to a plus 150 degree position, any position within that range being within what may be described as a locked position.

Switches 59 and 60 are used in a manner as hereinafter described to signal malfunctions of the system. Also, a current sense circuit 64 is associated with the motor drive control circuit 54 to sense excessive motor current, the current sense circuit 64 being coupled to the interface circuit 43 to the control circuit 42.

To signal malfunctions, a horn 66 is provided which is arranged to develop a loud audible signal and which is also connected to the interface circuitry 43 to the control circuitry 42.

Additional indicators may be provided on the control panel 26, including lights 67 and 68 which may be energized in accordance with the energization of the outside strobe lamps 23 and 24 to indicate functioning thereof, a light 69 to indicate a malfunction condition of either or both of the strobe lamps 23 and 24 or the energizing circuits 45 and 46, and a light 70 for indicating that an excessive motor current condition has been the cause of an alarm indication. Lights 67-70 may be L.E.D.'s or the equivalent.

The control box 19 further includes switches 71, 72, 73, 74 and 75 which are respectively operable by the actuators 37, 38, 39, 31 and 32, switches 71-75 being directly connected to the control circuitry 42. Control box 19 also includes therewithin a code switch unit which is accessible only by opening the box, and which may be set to require a certain code for deactivation of the horn 66.

Figure 4A:
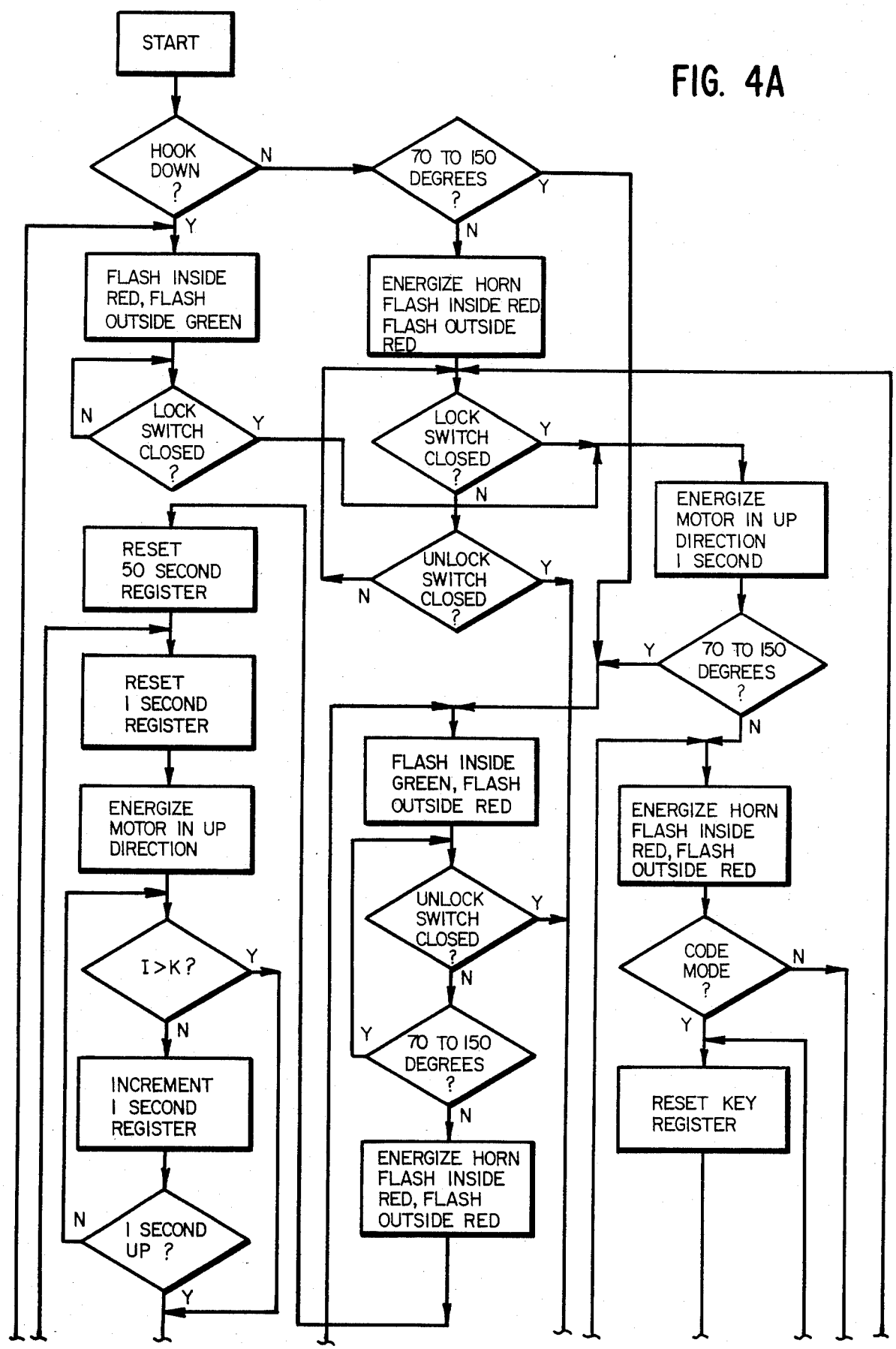
FIGS. 4A and 4B together form one flow chart and FIG. 5 forms another flow chart illustrating the mode of operation of the electrical circuitry of FIG. 3.
Figure 4B:
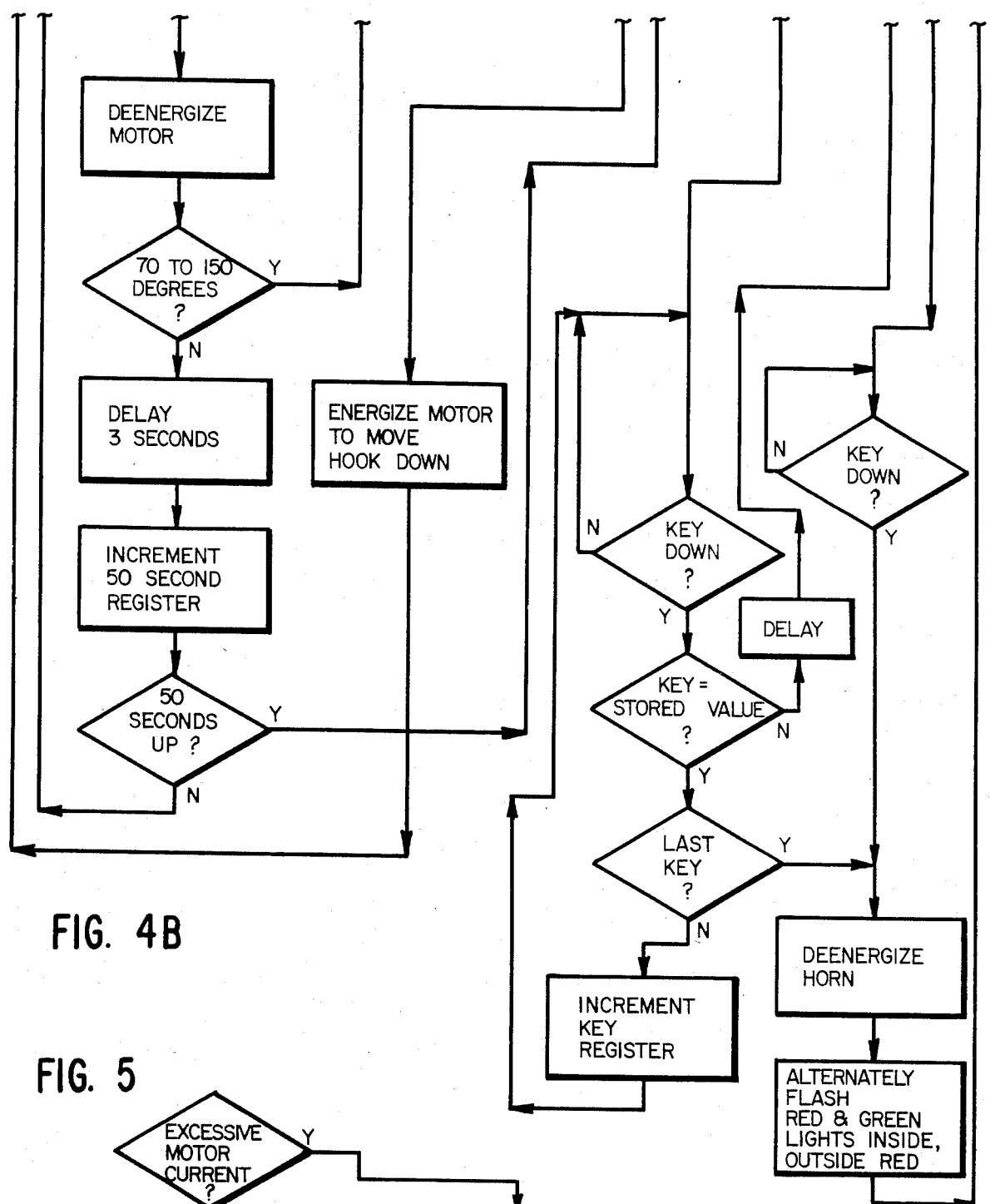
Figure 5:
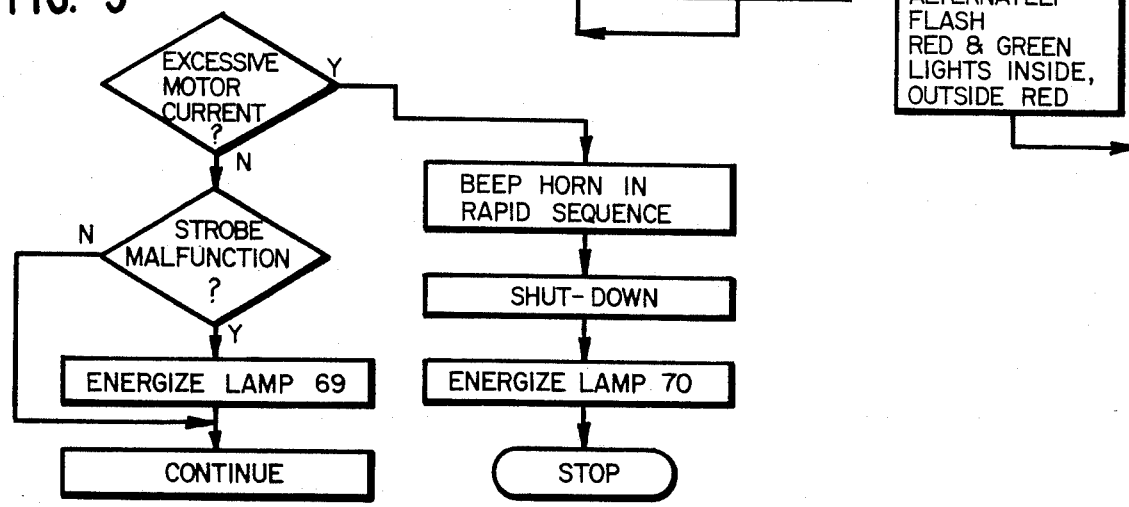

FIGS. 4A and 4B form one flow chart and FIG. 5 forms another flow chart which illustrate the operation of the control circuitry 42. It will be understood that the control circuitry 42 includes microprocessor circuitry to implement the operations shown in the flow charts. In the alternative, suitable programmable logic arrays may be used, or other equivalent types of control arrangements may be used.

When the system is initially energized, a determination is made as to whether the hook is down, i.e., if switch 59 is open. If not, a test is made to determine whether the member 12 is between the 70 degree and 150 degree positions. If not, the inside red light 27 is energized, either by periodic flashing or continuous energization, and at the same time the outside red strobe lamp unit 23 is flashed and the horn is energized. Then the lock switch 73 is checked to see if it is closed and, if not, the unlocked switch 74 is checked to see if it is closed. If neither switch is closed, the checks of such switches are repeated until one or the other is closed, the system remaining in a condition with both inside and outside lights flashing. If the lock switch 73 is closed, an initial locking operation is performed and then a slippage control operation is performed if the locking member drops below 70 degrees.

In the slippage control operation, a 50 second and one second timing registers are reset and then the motor 55 is energized to drive the hook 12 in an up direction. Then motor current is sensed to determine whether it exceeds a certain constant value K. If not, the one second timing register is incremented until one second has elapsed. The motor 55 is deenergized when the one second time interval exceeds the K value. Then a check of the switch 60 is made to determine if the member 12 is in the 70 to 150 degree range, as it normally should be. If it is, the inside green light is energized, either by flashing continuously to indicate that it is safe to load or unload the vehicle. At the same time, the outside red strobe light 24 is energized to indicate that it is not safe to attempt to park or remove a vehicle. Then a check is made of the unlock switch followed by a check of the switch 59.

If the unlock switch 74 is closed, the motor is energized to move the hook down, and then the inside red light 27 is energized while the outside green strobe light 24 is flashed. Then the lock switch is checked and whenever it is closed, the locking operation is repeated. If the unlock switch 74 remains open after the locking operation and if the hook is within the lock range from 70 to 150 degrees, repeated checks are made of the unlock switch followed by a condition of the hook. If, at any time while the hook is properly in the lock position, it should fall below 70 degrees, both the inside and outside red lights are energized and then the slippage control operation is repeated to bring the hook back into the proper locking range from 70 to 150 degrees.

If, during the slippage control operation, the hook fails to reach the 70 degree level after one second, the system delays for three seconds, increments the 50 second timer register and if 50 seconds are not up, the one second energization of the motor is repeated.

If, after repeated operations to attempt to reach the 70 degree level the 50 second interval should elapse, then an alarm operation is performed. The horn is energized and both the inside and outside red lamps are energized. The subsequent operation depends upon whether or not the circuitry is set for a code mode. In the code mode, the code switches 71-73 must be sequentially closed in accordance with a code stored internally and entered through the code switch circuit, indicated by reference numeral 76. If the correct code is entered, the horn is deenergized and the red and green lights on inside are flashed alternately, while the outside red light remains energized.

If an improper key is depressed, there is a delay prior to conditioning of the circuit for a repeat code entry.

If the system is not in the code mode, the depression of any key will cause entry into the alarm condition mode.

FIG. 5 illustrates an operation performed in response to a timer interrupt, a check being performed to determine whether an excessive motor current condition exists, or whether the strobe lamps are operating properly, the diagram being self-explanatory. Preferably, a unique series of rapid horn signals are developed to indicate the overcurrent condition and the system operates to prevent energization of the motor, until the condition which produced the excessive current is remedied.

It will be understood that modifications and variations may be effected without departing from the spirit and scope of the novel concepts of this invention.

I claim:

1. A signalling and control system for a dock facility including a loading dock and a releasable locking device operative to retain a parked vehicle at the dock, said locking device including a locking member having a lower unlocked position and an upper locked position in which it is lockingly engageable with a safety bar of a parked vehicle to hold the parked vehicle against the dock during loading and unloading of the vehicle, and electrically controllable reversible actuating means for moving said locking device between said unlocked and locked positions, said reversible drive means including drive means and a slip coupling between said drive means and said locking member said system comprising: outside and inside signal light means positioned and energizable to give vehicle operators and dock personnel clearly visible indications of when it is safe and unsafe to park or remove a vehicle and when it is safe to load and/or unload a parked vehicle, manually operable switch means accessible to dock personnel, and operating means coupled to said signal light means, to said switch means and to said actuating means for controlling said actuating means from said switch means and for energizing said signal light means in accordance with the condition of said locking device, said operating means being operative in response to actuation of said switch means to a lock condition to operate said drive means in a locking direction for a time interval of predetermined duration sufficient to normally effect upward movement of said locking member from said lower unlocked position and at least to said upper locked position, said operating means being operative in a slippage control mode for energizing said drive means to effect upward return movement of said lock member toward said locked position following downward slipping movement of said member from said locked position to a position intermediate said locked and unlocked positions.

2. In a system as defined in claim 1, operation of said operating means in said slippage control mode being repeated after a certain time delay following an operation in said slippage control mode which fails to return said lock member to said locked position.

3. In a system as defined in claim 2, said operating means being operative to develop an alarm signal when repeated operations in said slippage control mode and within a certain preset allowable time interval fail to return said lock member to said locked position.

4. In a system as defined in claim 1, over-travel indicating means for indicating over-travel of said locking member in an upward direction beyond said locked position.

5. In a system as defined in claim 4, said over-travel indicating means being in said operating means and being arranged to energize both outside signal light means and inside signal light means to indicate that it is unsafe to either park or remove a vehicle or load and/or unload a parked vehicle.

6. A system as defined in claim 1, comprising a control unit on the inside of the dock facility and including a control panel with said manually operable control switch means with said inside signal lights thereon, monitoring inside signal light means on said control panel energizable in accordance with the energization of said outside light means to permit monitoring of the energization of said outside light means by dock personnel, and malfunction-indicating signal light means on said control panel for indicating a malfunction of said outside light means, and means for energizing said malfunction-indicating signal light means upon a malfunction of said outside light means.

7. A system as defined in claim 1, comprising means for generating an alarm signal in response to malfunction of said system, an audible signal device, means responsive to said alarm signal for energizing said alarm device and for also energizing said outside and inside signal light means in a manner such as to indicate that it is not safe to park or remove a vehicle and that it is not safe to load and/or unload a parked vehicle, disabling means for deenergizing said audible signal device, and means operable upon deenergization of said audible signal device for continuing energization of said outside light means and then alternately energizing said inside signal light means so as to indicate the continued existence of a malfunction condition.

8. A system as defined in claim 1, comprising means for generating an alarm signal in response to malfunction of said system, an audible signal device, means responsive to said alarm signal for energizing said alarm device and for also energizing said outside and inside signal light means in a manner such as to indicate that it is not safe to park or remove a vehicle and that it is not safe to load and/or unload a parked vehicle, disabling means for deenergizing said audible signal device, said disabling means including a key pad having a plurality of pushbuttons, and means for deenergizing said audible signal device only when a predetermined code is keyed into said key pad.

* * * * *